United States Patent
Skilling et al.

(10) Patent No.: US 6,440,237 B1
(45) Date of Patent: Aug. 27, 2002

(54) PROCESS FOR FORMING COLD FORMED HIGH-LOAD BEARING STEEL PARTS

(75) Inventors: Michael J. Skilling, Ada; William Paul Vukovich, Wyoming, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/577,174

(22) Filed: May 23, 2000

(51) Int. Cl.[7] ................................................. C21D 8/00
(52) U.S. Cl. ........................ 148/650; 148/906; 148/651; 148/649; 384/492; 384/548; 384/912; 384/625
(58) Field of Search ................................. 148/906, 650, 148/651, 649; 384/492, 548, 912, 625

(56) References Cited

U.S. PATENT DOCUMENTS

| | | | |
|---|---|---|---|
| 3,001,897 A | * 9/1961 | Natchman | 148/603 |
| 4,040,688 A | * 8/1977 | Grell | 148/603 |
| 4,202,082 A | 5/1980 | Williams | 29/149.5 B |
| 5,077,003 A | * 12/1991 | Muraoka et al. | 148/906 |
| 5,447,579 A | * 9/1995 | Hirakawa et al. | 148/906 |
| 5,453,139 A | 9/1995 | Gallagher, Jr. | |
| 5,626,974 A | * 5/1997 | Mitamura | 148/906 |
| 6,165,289 A | * 12/2000 | Matsumoto et al. | 148/906 |
| 6,171,411 B1 | * 1/2001 | Okita et al. | 148/906 |
| 6,228,184 B1 | * 5/2001 | Tanaka et al. | 148/325 |

OTHER PUBLICATIONS

Publication: Nedschroff Herentals NV IFE 1999 Rondtable: Heading Machings & Tooling, May 27, 1999 Presentation by Ferdinand Kersten.

* cited by examiner

Primary Examiner—Deborah Yee
(74) Attorney, Agent, or Firm—John VanOphem

(57) ABSTRACT

A process for forming a roller bearing comprising the steps of providing a cylindrical slug that comprises at least 0.7 weight percent carbon and up to 1.6 weight percent of at least one alloying element. The slug has lateral and side surfaces. A centered indentation is formed in each side surface. A circular chamfer surface is formed at the intersection of each side and each lateral surface, thereby producing an upsetting slug. The upsetting slug is cold formed, thereby deepening the centered indentations and forming a blank. The blank has a web separating the deepened indentations and end surfaces and chamfer surfaces that are substantially at net shape for the roller bearing. The web is removed from the blank, thereby forming a pierced blank having a through hole with an inner surface. The inner and lateral surfaces of the pierced blank are finished to the specified inner and outer diameters for the roller bearing.

20 Claims, 1 Drawing Sheet

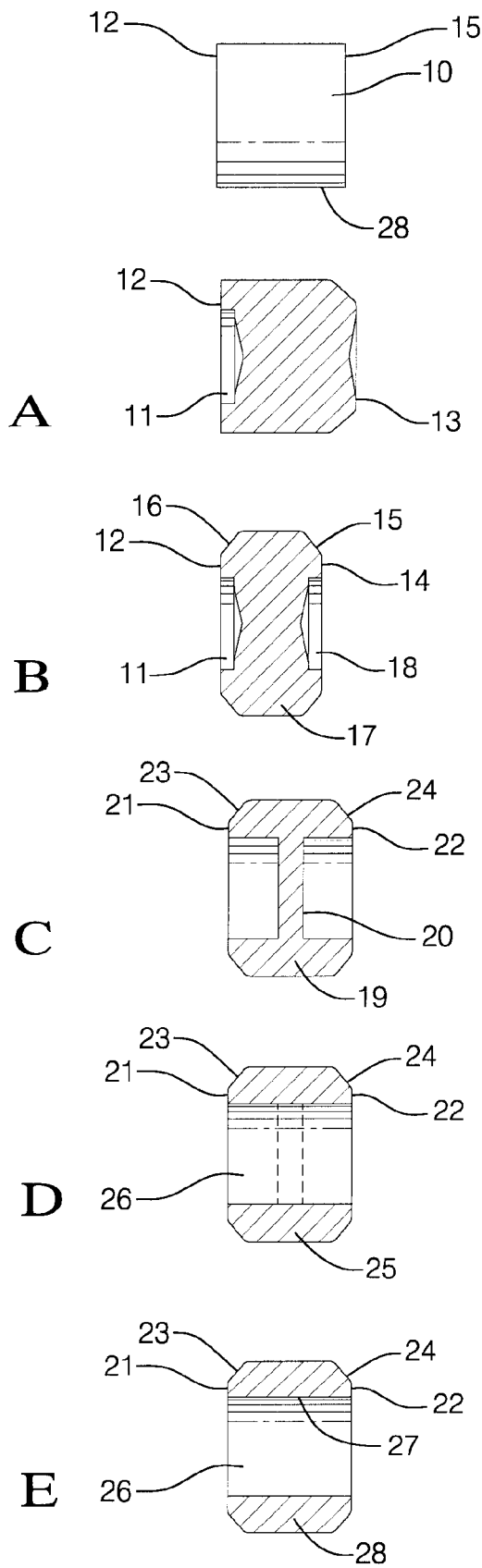
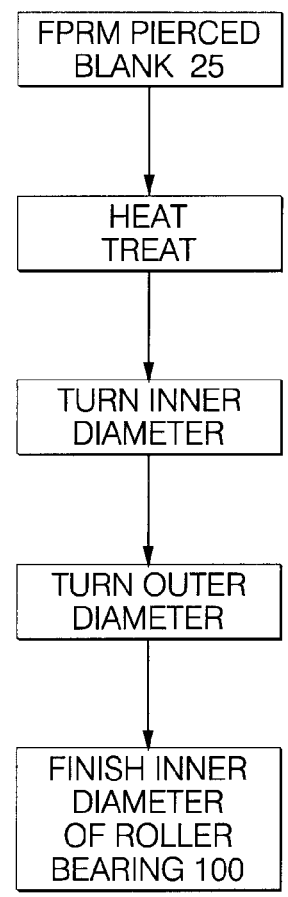
FIG. 1
FIG. 2

PROCESS FOR FORMING COLD FORMED HIGH-LOAD BEARING STEEL PARTS

CROSS-REFERENCE TO RELATED APPLICATION

This application is related to co-pending, commonly assigned application Ser. No. DP-300043, filed May 23, 2000 for PROCESS FOR FORMING STEEL ROLLER BEARINGS, the disclosure of which is incorporated herein by reference.

TECHNICAL FIELD

The present invention relates to cold formed steel parts and, more particularly, to cold formed high-load bearing steel parts such as roller bearings. Most particularly, the present invention relates to the use of high strength, high carbon steels to form these parts, and to a process for forming them.

BACKGROUND OF THE INVENTION

High-load bearing steel parts made of high strength steels are widely used in the automotive industry for a variety of applications, such as for example, roller bearings included in hydraulic valve lifters and roller finger followers for automotive engines. Critical features of these roller bearings, such as their inside diameters, outside diameters and diametral surfaces, must be manufactured to close engineering tolerances to optimize performance and to minimize wear under extreme engine operating conditions. The need for high strength steels manufactured to exacting tolerances has become even greater with the application of smaller, more efficient engines in today's vehicles.

Typically, roller bearings are fabricated from high carbon steel by hot or warm forging processes or by machining bar stock. Hot forging requires first heating a steel slug in its preformed state to a temperature between 1600° F. to 2000° F. to allow formability. Mechanically forming techniques such as upsetting, heading, and extrusion, which are well known in the art, are then used to bring the shape of the part close to the final desired form. However, because of surface scaling resulting from the high temperature preheating process and because of the dimensional growth of the part as the part cools, a substantial amount of final machining is required to bring the part to its required dimensions. For example, the diametral surfaces of the part must be machined to their final dimensions and surface finish. The inside and outside diameters must also be machined to their final dimensions and surface finish. Because of the amount of material that must be removed, the machining often must be completed in several steps including rough cutting, grinding, and honing. These added machining operations are time consuming, add manufacturing steps to the process, and require the use of expensive machine tools. Furthermore, the added machining operations can produce inconsistent results which can vary significantly from part to part. Moreover, with the use of ovens or heaters to bring the slug up to temperature for forming, and the need to handle extremely hot parts during the process, there is added safety issues.

Warm forging requires the steel slug to be first heated to a lower temperature than the hot forming process—between 300° F. and 1600° F.—before the part is mechanically formed using one of the forming methods described above. While surface scaling typically does not occur because of the relatively lower temperatures used in the warm forming process, dimensional growth of the part does occur as the part cools. As a result, a substantial amount of final machining is similarly required. Thus, the warm forming process does not eliminate the time consuming and expensive steps of machining and finishing the diametral surfaces and the inner and outer diameters, the dimensional variations caused by the machining and finishing, nor the potential dangers found in the hot forming process.

Machining the part to the required dimensions from bar stock eliminates the expense and potential dangers of having to preheat the slug before forming. But cycle times are even longer than either the hot or warm forming processes since more material has to be removed to reach the final desired dimensions. Moreover, a greater amount of material must be inventoried to manufacture the part and a substantial amount of material is wasted in the form of metal shavings. Expensive machine tools are required and the results from the machining operations can vary widely from part to part. Also, since substantially more machining and final finishing of the part is required, a significant amount of cost is added to the product due to the higher cost of skilled labor and the additional energy consumption associated with the machining and finishing.

Cold forming processes, as defined in this application, are carried out at temperatures ranging from the ambient up to about 300° F. and include techniques such as upsetting, heading, and extrusion. U.S. Pat. No. 4,202,082 to Williams discloses a method of manufacturing a spherical bearing rod end having cold formed faces that include an annular area to serve as the outer race member. However, since the method does not use a high strength, high carbon steel slug to form the load bearing surfaces, the finished part must utilize additional metal inserts for the load bearing surfaces. U.S. Pat. No. 5,453,139 to Gallagher, Jr. discloses a method of making cold formed high strength parts from steel that has a ferrite-pearlite microstructure and consists of about 0.30 to about 0.65 wt. % carbon, about 0.30 to about 2.5 wt.% manganese, and up to about 0.35 wt. % of at least one grain refiner from the group consisting of aluminum, niobium, titanium, vanadium, and mixtures thereof, the balance being iron. However, the method is limited to steels having a carbon content lower than the present invention and lower than that found to be most desirable for roller bearings having optimal performance and minimal wear characteristics.

Until the present invention, it was thought that cold forming a part from high strength, high carbon steel would likely result in the formation of cracks in the finished part. Therefore, what was needed in the art is a high load bearing part that can be produced by a method that minimizes the need for finishing and/or machining operations. Furthermore, what was needed in the art is a high load bearing part that does not require additional metal inserts or other parts to serve as the load bearing surfaces. Moreover, what was needed in the art is a high load bearing part that has the preferred carbon content for use in roller bearings. Even further, what was need in the art is a high load bearing part that minimizes the scrap and waste of raw materials. Finally, what was needed in the art is a high load bearing part that can be made to close dimensional tolerances with minimal part-to-part variation.

SUMMARY OF THE INVENTION

The present invention relates to a method of forming a high load bearing part, such as a roller bearing, from a high strength, high carbon steel, using a cold forming method of fabricating the part that minimizes waste and minimizes the amount of machining or finishing required after the part is formed. The term "net shape" as used herein means that the dimension of the part, as a result of the forming process, requires no further machining to achieve its final desired dimension.

The present invention provides a high load bearing part made of high carbon steel and a method of forming the part using a cold forming process where its critical surfaces are either net shaped by the cold forming process or require minimal finishing to achieve the desired dimensions.

The present invention is directed to a cold formed high-load bearing steel part comprising high-carbon steel having at least 0.7 weight percent carbon and up to 1.6 weight percent of at least one alloying element. The present invention is further directed to a process for making the steel part that comprises: providing a slug made of high-carbon steel that comprises at least 0.7 weight percent carbon and up to 1.6 weight percent of at least one alloying element and has volume sufficient to form the part; cold forming the slug to form a blank having lateral and end surfaces; and finishing the surfaces as required to form the part.

Further in accordance with the present invention is a process for forming a roller bearing that comprises: providing a cylindrical slug having at least 0.7 weight percent carbon and up to 1.6 weight percent of at least one alloying element and has lateral and circular end surfaces and sufficient volume to form the roller bearing. A centered indentation is formed in each end surface, and a circular chamfer surface is formed at each intersection of the end and lateral surfaces, thereby producing an upsetting slug.

The upsetting slug is cold formed, thereby deepening the centered indentations and forming a blank that has a web separating the deepened indentations and end surfaces and chamfer surfaces that are substantially at net shape for the roller bearing. The web is removed from said blank, thereby forming a pierced blank having a through hole with an inner surface. The inner and lateral surfaces of the pierced blank are finished to dimensions having, respectively, the specified inner and outer diameters for the roller bearing.

The present invention provides a high load bearing part, such as roller bearings made, inexpensively, from high strength, high carbon steels, and using a cold forming process. The high load bearing parts, made according to the present invention can be efficiently made from a steel having a preferred carbon content for improved durability and wear.

The above-mentioned and other features and advantages of this invention, and the manner of attaining them, will become apparent and be better understood by reference to the following description of the invention in conjunction with the accompanying drawings.

BRIEF DESCRIPTION OF THE DRAWINGS

FIG. 1 depicts the steps in the process of forming a cold formed roller bearing in accordance with the present invention.

FIG. 2 is a flow chart that shows the step of heat treating the pierced blank prior to finishing the roller bearing.

DESCRIPTION OF THE PREFERRED EMBODIMENT

Cold forming fabrication of steel parts typically utilizes low- to medium-carbon steels, i.e., steels having a carbon content of 0.6 weight percent or less. It has been generally believed in the art that cold forming a part from higher-carbon steels, which exhibit preferred durability and wear characteristics as compared to low-to medium-carbon steels, would result in the formation cracks or fractures. Thus, higher-carbon steels have been generally employed in warm and hot forging processes at temperatures in the range of about 300–2200° F. As previously noted, warm and hot forged products typically have less readily controlled net shape dimensions than those obtained by cold forming and may thus require further processing to meet specifications.

The present invention provides for net shape fabrication by cold forming of high-load bearing steel parts such as roller bearings from high-carbon steel containing at least 0.7, preferably at least 1.0, weight percent carbon together with up to 1.6 weight percent of at least one alloying element. Preferred alloying elements include molybdenum, chromium, nickel, vanadium, and mixtures thereof, chromium being especially preferred. Steels useful for the practice of the present invention include, for example, grades 1074, 1090, 51100, and 52100 steel. A preferred steel is 52100 grade, which contains 1.00 weight percent carbon and 1.45 weight percent chromium.

In a process for forming high-load bearing steel parts in accordance with the present invention, a slug of high-carbon steel having a carbon content of at least 0.7 eight percent and up to 1.6 weight percent of at least one alloying element and of sufficient volume to form the desired part is cold formed to form a blank having lateral and end surfaces. These surfaces are then finished, using methods known in the art, for example, grinding, burnishing, honing, coining, piercing, and combinations thereof, to produce the desired dimensions of the part.

Cold forming, which can be carried out at temperatures ranging from ambient to about 300° F., includes upsetting, where the cross-sectional area of a portion or all of a slug is increased, and extruding, where the slug is forced through the orifice of a die to produce a blank of decreased uniform cross-section. Heading is also included where the blank to be upset is a wire, rod or bar stock. Upsetting at substantially ambient temperature, which is preferred for the practice of the present invention, can be carried out using commercially available machinery such as a nut former or a header machine.

Following cold forming and prior to finishing, the blank can be heat treated as known in the art, i.e., austenitized, quenched, and tempered to produce sufficient hardness for the desired application. Useful austenitizing temperature and time ranges are about 1475° F. to about 1625° F. for about 30 minutes to about 90 minutes. Parts that can be advantageously formed by the process of the present invention include rollers, cam rollers, roller bearings, bearing races, nuts, and the like.

In one embodiment, the present invention provides for a cold formed high-load bearing steel part such as a roller bearing, which can be produced substantially at net shape and requires only minimal adjustment of its inside and outside diameters to their specified dimensions. Shown in FIG. 1 are the steps for fabricating a roller bearing 100 by the cold forming process of the present invention.

At station A, a cylindrical slug 10 of the length necessary to provide the proper volume of metal to form the roller bearing is sheared from bar stock and squared up, and an indentation 11 is made in one side 12 to form an indent slug 13.

At station B, a second indentation 14 is made in the opposite side 15 of indent slug 13, and circular chamfers 16 and 17 are formed, producing upsetting slug 18.

At station C, upsetting slug 18 is cold formed by applying pressure to indentations 11 and 14 to produce a blank 19 having a web 20 and parallel end surfaces 21 and 22 and chamfer surfaces 23 and 24 that are substantially at net shape for roller bearing 100.

At station D, web 20 is pierced out of blank 19, thereby forming a pierced blank 25 having a through hole 26.

At station E, through hole 26 is burnished to remove the pierce flash and to form a bearing inner surface 27 and a lateral outer surface 28 having, respectively, inner and outer diameters that substantially meet the specifications for roller bearing 100 of the present invention.

FIG. 2 is a flow chart that shows the step of heat treating pierced blank 25 prior to the finishing step. Following the heat treatment, the inner and lateral outer surfaces of the hardened pierced blank are turned to produce substantially the required inner and outer diameters. Finishing the inner surface completes the fabrication of roller bearing 100.

The invention has been described in detail for the purpose of illustration, but it is to be understood that such detail is solely for that purpose, and variations can be made therein by those skilled in the art without departing from the spirit and scope of the invention, which is defined by the following claims.

What is claimed is:

1. A process for forming a cold formed high-load bearing steel part, said process comprising:

obtaining a slug having a volume sufficient to form said part, said slug comprising high-carbon steel having at least about 1.0 weight percent carbon and up to 1.6 weight percent of at least one alloying element;

cold forming said slug to form a blank having a lateral surface and an end surface; and finishing said lateral surface to form said steel part.

2. The process of claim 1 further comprising the step of obtaining a slug wherein said alloying element is selected from the group consisting of molybdenum, chromium, nickel, and vanadium.

3. The process of claim 2 wherein said alloying element is chromium.

4. The process of claim 1 wherein said step of obtaining a slug comprises the step of obtaining a slug comprising a high-carbon steel having about 1.0 weight percent carbon and about 1.45 weight percent chromium.

5. The process of claim 1 wherein said cold forming step further comprises one of the steps of upsetting said part or extruding said part.

6. The process of claim 1 wherein said finishing step further comprises the step methods selected from turning, grinding, burnishing, honing, coining, and piercing.

7. The process of claim 1 further comprising:

following said cold forming step and prior to said finishing step heat treating said blank, to harden said blank.

8. The process of claim 1 wherein said step of obtaining said steel part further comprises the step of obtaining said steel part from the group consisting of a roller, a cam roller, a roller bearing, a bearing race, and a nut.

9. A process for forming a roller bearing, said process comprising:

obtaining a cylindrical slug having lateral and side surfaces and having sufficient volume to form said roller bearing, said slug comprising a high-carbon steel that having at least 0.7 weight percent carbon and up to 1.6 weight percent of at least one alloying element;

forming in said slug a centered indentation in each said side surface and a circular chamfer surface at each intersection of said side and lateral surfaces;

after said forming step cold forming said slug, including deepening said centered indentations and forming a blank, having a web separating said deepened indentations and having end surfaces and chamfer surfaces that are substantially at net shape for said roller bearing;

removing said web from said blank, thereby forming a pierced blank having a through hole with an inner surface; and finishing said inner and lateral surfaces to dimensions having, respectively, specified inner and outer diameters for said roller bearing.

10. The process of claim 9 wherein said step of obtaining said slug further comprises the step of obtaining a slug comprising high-carbon steel having at least 1.0 weight percent carbon.

11. The process of claim 9 further comprises the step of obtaining a slug wherein said alloying element is selected from the group consisting of molybdenum, chromium, nickel and vanadium.

12. The process of claim 11 wherein said alloying element is chromium.

13. The process of claim 9 wherein said step of obtaining a slug comprises the step of obtaining a slug comprising a high-carbon steel having about 1.0 weight percent carbon and about 1.45 weight percent chromium.

14. The process of claim 9 wherein said cold forming step includes the step of upsetting said slug.

15. The process of claim 9 wherein said cold forming step further comprises the step of heating said part to temperature in the range of approximately ambient to approximately 300° F.

16. The process of claim 9 wherein said finishing step is carried out by selecting a finishing method selected from turning, grinding, burnishing, honing, coining, and piercing.

17. The process of claim 9 further comprising:

prior to said finishing, heat treating said pierced blank, to harden said pierced blank.

18. The process of claim 1 wherein said high-carbon steel is 52100 grade steel.

19. The process of claim 5 wherein said cold forming step further comprises upsetting said part at substantially ambient temperature.

20. The process of claim 6 wherein said heating said blank is carried out at a temperature of about 1475° F. to about 1625° F. for about 30 minutes to about 90 minutes.

* * * * *